United States Patent [19]

Blalock

[11] Patent Number: 5,328,557
[45] Date of Patent: Jul. 12, 1994

[54] PLASMA TREATMENT OF O-RINGS

[75] Inventor: Guy T. Blalock, Boise, Id.

[73] Assignee: Micron Semiconductor, Inc., Boise, Id.

[21] Appl. No.: 1,478

[22] Filed: Jan. 7, 1993

[51] Int. Cl.$^5$ .............................................. B05D 5/00
[52] U.S. Cl. ..................................... 156/643; 156/646; 156/668; 204/192.35; 204/192.36
[58] Field of Search ................... 156/643, 646, 668; 204/192.34, 192.36, 192.35

[56] References Cited
U.S. PATENT DOCUMENTS

| 4,064,030 | 12/1977 | Nakai et al. | 204/192.34 X |
| 4,337,279 | 6/1982 | Polak | 204/174 X |
| 4,379,180 | 4/1983 | Baglin et al. | 156/668 X |
| 4,410,586 | 10/1983 | Ladizesky et al. | 156/668 X |
| 4,416,724 | 11/1983 | Fischer | 156/643 X |
| 4,568,598 | 2/1986 | Bilkadi et al. | 204/192.36 X |

Primary Examiner—Thi Dang
Attorney, Agent, or Firm—Lia M. Pappas

[57] ABSTRACT

A method for treating an O-ring to substantially eliminate the adhesion of wafers to the O-ring in semiconductor equipment, which method comprises the steps of: placing an O-ring in a reactor, exposing the O-ring to an ionizing gas for approximately two minutes, and placing the O-ring in the instrument in which the O-ring will function.

14 Claims, 1 Drawing Sheet

PLASMA TREATMENT OF O-RINGS

FIELD OF THE INVENTION

This invention relates to semiconductor equipment, and more particularly to the maintenance of O-rings and lipseal O-rings used in high vacuum tools and etch tools.

BACKGROUND OF THE INVENTION

Most current generation etch tools require the use of helium backside cooling in order to maintain wafer temperature within stable ranges. The method for achieving sufficient cooling usually involves the use of lipseal O-rings in order to contain the high pressure helium on the backside of the wafer. The lipseals function to secure the etch chamber electrode to the backside of the wafer in order to prevent leakage, which leakage leads to wafer photoresist burning. Lipseal design, material, and hardness must be optimized to produce the proper seal having a sufficient lifetime in a reactive plasma.

Elastopolymeric PTFE (polytetrafluoroethylene or Teflon TM) compounds are currently the most frequently used materials for use in O-rings.

One significant drawback in the use of lipseal O-rings, and more particularly O-rings fabricated from elastopolymeric PTFE compounds, is that wafers often stick to the lipseal during semiconductor processing. The problem is most notable when high power plasma processes are run. In such cases, a large amount of power (in the form of heat) must be transferred through the wafer, which consequently heats the O-ring. As a result, the lipseal O-ring often fuses to the backside of the wafer. When this occurs, the lipseal can be dislodged from its groove. The misplacement of the O-ring seal causes the next wafer placed into the etch chamber to be burned due to inadequate seal, or broken due to the force of the mechanical wafer clamp.

Seal stickage is also notable in cases in which a seal is placed under high mechanical pressure, such as a slit valve type of assembly frequently used in doors of various instruments. If the valve is activated open by a spring or gravitational method, the O-ring stickage may become severe enough to prohibit valve opening because the spring tension may not be great enough to overcome the adhesion of the door to the O-ring.

O-ring suppliers have tried various methods to prevent the occurrence of lipseal stickage, but to date, have not identified a reliable method to prevent its occurrence.

SUMMARY OF THE INVENTION

The lipseal stickage problem is substantially relieved by the process of the present invention in which the wafer sealing surface is exposed to a plasma which is inert to the compound from which the O-ring was formed for a period of approximately two minutes. Argon containing plasmas have proven effective in preventing O-ring stickage.

Preferably, an unused O-ring is subjected to an inert plasma. The plasma process adds controlled microroughness to the sealing surface of the O-ring which substantially eliminates O-ring stickage. After undergoing the process of the present invention, the O-ring is then placed in the equipment in which it is to be used.

Lipseal stickage problems are usually not detected unless wafers are burned or broken, resulting in machine downtime. Thus, one advantage of the process of the present invention is the tremendous manufacturing and financial benefits that inure from the prevention of wafer stickage and the consequences thereof.

BRIEF DESCRIPTION OF THE DRAWINGS

The present invention will be better understood from reading the following description of nonlimitative embodiments, with reference to the attached drawing, wherein below.

DETAILED DESCRIPTION OF THE INVENTION

Figure 1:
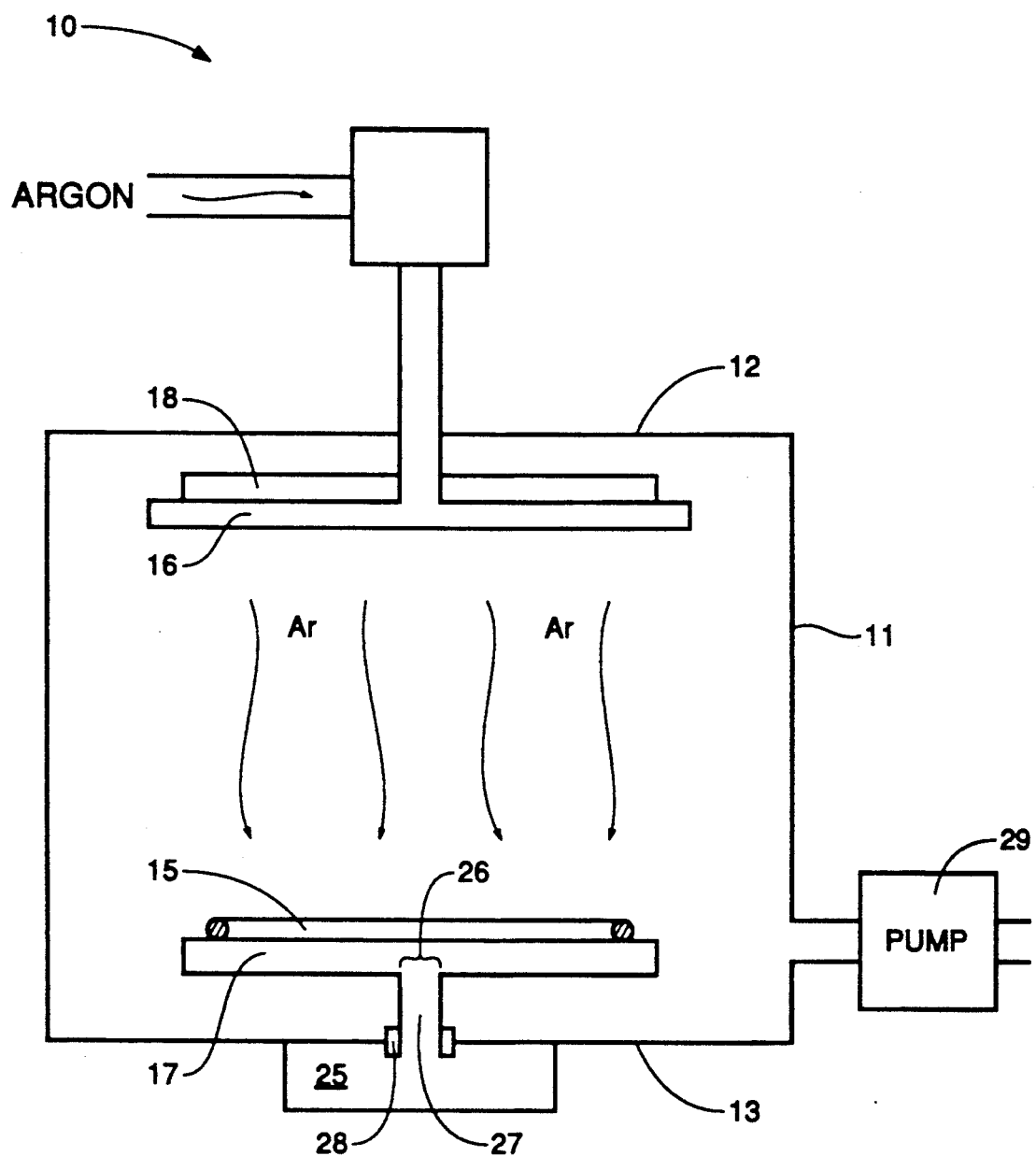
FIG. 1 is a schematic cross-section of a typical etch chamber in which an O-ring may be used.

Referring to FIG. 1, there is depicted a partial cross sectional view of an exemplary plasma etching chamber in which is disposed an O-ring 15. The plasma etcher, generally indicated by the numeral 10, is typically used for carrying out etching steps in the manufacture of semiconductors. The chamber 10 is comprised of a hollow, cylindrical member 11 having upper and lower end plates 12 and 13, respectively. A pair of cylindrical, spaced apart, disc-shaped top and bottom electrodes 16 and 17, respectively, are positioned within the chamber 10.

Top electrode (also referred to as an anode) 16 has a resistive heating pad 18 in contact with the upper surface thereof. The bottom electrode (also referred to as a cathode) 17, which can be made of aluminum or the like, has a central aperture 26 and is fixedly connected to a hollow metal pipe 27 which is insulated from the lower end plate 13 by a hermetic bushing 28. Pipe 27 is the coolant input conduit. The upper end of pipe 27 is connected to the bottom electrode 17, and provides the coolant which flows through the bottom electrode 17. The wafer (not shown) rests on an O-ring 15, which O-ring 15 is disposed on the bottom electrode 17. The cooling apparatus enables the wafer to be maintained at a temperature between −30° and 100° C. A vacuum pump 29 serves to maintain a vacuum within chamber 10 and also to remove spent gases therein.

For purposes of this application, and for ease of discussion electrode 16 will be referred to as an anode, and electrode 17 will be referred to as a cathode. It would be understood by one skilled in the art that the anode need not be the top electrode and vice versa.

The process gases that are associated with etching are applied to the reactor 10 through the anode electrode 16. The direction of the gas flow is indicated by the solid arrows. The frequency power is applied to the chamber 10 by applying the power to the electrode 17 to excite the reactive species.

FIG. 1 also illustrates the addition of an ionizing gas, such as for example argon, into the etch chamber 10, during the preferred process of the present invention. However, the process of the present invention can be carried out in any high vacuum plasma process system known in the art, such as a parallel plate reactor or a reactive ion etcher (RIE). The important aspect being the formation of a D.C. self-bias which causes charged particles (i.e., ions) to be accelerated toward the exposed surface, in this case, the sealing surface of the O-ring 15.

The process of the present invention, especially when performed on a new O-ring 15 prior to its use in an etcher, prevents the problems of contaminating residues or excessive surface smoothness. Surface contamination or excessive smoothness of the O-ring surface 15 results in bonding or adhesion of the O-ring 15 to the wafer which is disposed thereon.

A solution is provided by the present invention which is to flow a small amount of argon, or other suitable gas which is inert to the O-ring, such as fluorine, into the process chamber 10 through the gas distribution ring in the top electrode 16. The addition of an ionizing gas is believed to remove contaminating residues and to add surface micro-roughness. The micro-roughness is believed to overcome the adhesion of the smooth wafer surface to the smooth O-ring surface 15.

The ionizing gas is pumped into the chamber 10 in which a plasma is excited, whereupon the ion bombardment of the surface of the lipseal O-rings 15 proceeds. The charged particles are accelerated, and impact the surface 15 with enough force to displace atoms therein to create micro-roughness. The frequency of power must allow for adequate formation of self-bias to insure ion bombardment, preferably in the range of 100 kHz–60 mHz. The plasma field is created by a frequency driven electric field at 25.

The process parameters include a pressure range of 2–200 mTorr. The inert gas flow is usually in the range of 10–100 sccm. The preferred power to the system is in the range of 50–500 watts/cm$^2$ at a radio frequency (RF) of 13.56 MHz. The process parameters can vary a great deal as long as a sufficient D.C. self-bias is generated to result in ion formation and ion bombardment of the subject surface.

In the preferred embodiment, the ionizing gas flow is ceased after the process has been completed, preferably 2 minutes. The end products are then evacuated from the chamber 10 via mechanical pump assembly 29.

Experiments were undertaken employing the process of the present invention in an Applied 5000 Magnetically Enhanced Reactive Ion Etcher, sold by Applied Materials Corporation of Santa Clara, Calif., on wafers displaying significant wafer stickage. After the surface of the O-ring 15 was plasma treated, the appearance of any contaminating residues or excessive surface smoothness, and the consequent stickage, were substantially eliminated.

All of the U.S. patents and patent applications cited herein are hereby incorporated by reference herein as if set forth in their entirety.

While the particular process as herein shown and disclosed in detail is fully capable of obtaining the objects and advantages herein before stated, it is to be understood that it is merely illustrative of the presently preferred embodiments of the invention and that no limitations are intended to the details of construction or design herein shown other than as described in the appended claims. For example, one having ordinary skill in the art will realize that the plasma need not be an "inert gas," but the plasma chosen must be inert with respect to the material from which the O-ring was made.

What is claimed is:

1. A process for preventing excess surface adhesion in an O-ring, said process comprising the steps of:
   disposing an O-ring in a chamber;
   providing an atmosphere in said chamber by flowing at least one gas;
   exciting said atmosphere to form a plasma; and
   removing residue from said chamber through a pump.

2. The process according to claim 1, wherein said atmosphere has a pressure within the range of approximately 2–200 mTorr.

3. The process according to claim 2, wherein said at least one gas comprises fluorine.

4. The process according to claim 2, wherein said at least one gas comprises argon.

5. The process according to claim 4, wherein said argon is provided at a flow substantially in the range of 10–100 sccm.

6. The process according to claim 5, wherein said atmosphere is excited at a radio frequency (RF) of approximately 13.56 MHz, with a power density of plasma of approximately 50–500 W/cm$^2$.

7. The process according to claim 6, wherein said plasma creates micro-roughness in said O-ring, thereby substantially eliminating surface adhesion.

8. The process according to claim 7, wherein said chamber is selected from a group consisting of a parallel plate reactor, a reactive ion etcher and a plasma etcher.

9. The method according to claim 1, wherein said flow of gas being inert with respect to said smooth surface of said workpiece.

10. A method for preparing an O-ring for use in a plasma reactor chamber, comprising the following steps:
    providing a planar plasma etch reactor, said reactor having an O-ring disposed therein, said O-ring having a contact surface;
    establishing a flow of gas comprising at least argon through said reactor, thereby creating an atmosphere;
    exciting a plasma in said atmosphere, said plasma reacting with said surface of said O-ring to create micro-roughness on said surface; and
    evacuating said interior of said reactor.

11. The method according to claim 10, wherein said atmosphere is excited by electromagnetic energy, said electromagnetic energy having a frequency substantially in the range of 5 MHz to 20 MHz.

12. The method according to claim 9, wherein said flow of gas comprises argon.

13. The method according to claim 10, wherein said argon is introduced into said reactor substantially in the range of 10–100 sccm.

14. The method according to claim 10, wherein said argon ionizes by means of electromagnetic energy, said argon reacting with said O-ring surface thereby creating a substantially less adhesive O-ring surface.

* * * * *